United States Patent [19]
Zygutis et al.

[11] Patent Number: 5,251,842
[45] Date of Patent: Oct. 12, 1993

[54] DUAL-SPRING RETRACTOR OPERABLE BY A SERIES OF DISCS

[75] Inventors: James L. Zygutis, Frankfort, Ill.; Gerald A. Doty, Crown Point, Ind.

[73] Assignee: Takata Inc., Auburn Hills, Mich.

[21] Appl. No.: 689,985

[22] Filed: Apr. 23, 1991

[51] Int. Cl.⁵ ............................................. B60R 22/44
[52] U.S. Cl. ............................................. 242/107
[58] Field of Search ................... 242/107, 107.4 R; 280/807; 297/474, 476, 478, 475

[56] References Cited

U.S. PATENT DOCUMENTS

| | | | |
|---|---|---|---|
| 4,026,494 | 5/1977 | Tanaka | 242/107.4 R |
| 4,081,153 | 3/1978 | Tanaka et al. | 242/107 |
| 4,113,200 | 9/1978 | Tanaka | 242/107 |
| 4,113,201 | 9/1978 | Ziv | 242/107 |
| 4,120,467 | 10/1978 | Stephenson | 242/107 |
| 4,123,013 | 10/1978 | Bottrill et al. | 242/107 |
| 4,126,282 | 11/1978 | Morita et al. | 242/107 |
| 4,162,772 | 7/1979 | Shimogawa et al. | 242/107 |
| 4,165,844 | 8/1979 | Tanaka | 242/107 |
| 4,205,807 | 6/1980 | Shimogawa et al. | 242/107 |
| 4,212,435 | 7/1980 | Kawaharazaki | 242/107 |
| 4,213,580 | 7/1980 | Kawaharazaki | 242/107 |
| 4,303,208 | 12/1981 | Tanaka | 242/107 |
| 4,310,128 | 1/1982 | Morita et al. | 242/107 |
| 4,342,435 | 8/1982 | Yanagihara | 242/107 |
| 4,383,658 | 5/1983 | Morita et al. | 242/107 |
| 4,483,494 | 11/1984 | Takada | 242/107 |
| 4,564,153 | 1/1986 | Morinaga et al. | 242/107 |
| 4,568,037 | 2/1986 | Kawaguchi et al. | 242/107 |
| 4,592,520 | 6/1986 | Kawaguchi | 242/107 |
| 4,907,757 | 3/1990 | Rumpf et al. | 242/107.6 |
| 4,913,372 | 4/1990 | Takada | 242/107 |
| 4,943,011 | 7/1990 | Kitamura et al. | 242/107 |
| 4,993,657 | 2/1991 | Brown | 242/107 |

Primary Examiner—Daniel P. Stodola
Assistant Examiner—John Q. Nguyen
Attorney, Agent, or Firm—Fitch, Even, Tabin & Flannery

[57] ABSTRACT

A dual spring seat-belt retractor system with a tension-ease system operable to provide one of two springs continuously maintaining a retractive force on the belt to maintain the belt against the wearer in the tension-ease mode, which tension-ease system is automatically initiated at the cessation of belt protraction with a slight retraction to engage latch means that renders one of the springs ineffective to provide a reduced belt tension. A lost motion connection between the belt reel and the latch means permits limited belt movement by the user while maintaining the reduced tension until a predetermined retraction occurs.

8 Claims, 3 Drawing Sheets

DUAL-SPRING RETRACTOR OPERABLE BY A SERIES OF DISCS

BACKGROUND OF THE INVENTION

This invention relates to a seat belt retractor employing dual springs to rewind the seat belt webbing.

The present invention is directed to providing a seat belt system and retractor that will assure sufficient rewind force from two springs to rewind a long length of belt and to overcome other resistances that sometimes result in the belt not being completely rewound when a single spring is used. For the comfort of the wearer, the spring force from the conventional single rewind retractor is kept relatively low, and then additional friction as from a turning loop or from the belt becoming stiffer with age may cause the belt not to be rewound completely. The automobile manufacturers and their customers prefer that the seat belts be fully wound as they exit the vehicle.

There are currently being marketed comfort mechanisms or devices on retractors, which completely block the rewind tension forces of the reel spring from the belt wearer's neck and chest. Such systems are open to the complaint that the wearer may induce too much slack between himself and the belt. Usually, these systems insure that the belt will be completely rewound when the wearer leaves the vehicle by a door plunger which is operated with the wearer's opening of the adjacent door to release the tension-relieving mechanism to assure that the belt will have a chance to rewind onto the retractor reel. Such door plunger and release mechanisms are expensive additions that are desired to be eliminated.

The present invention is directed to a dual spring retractor which eliminates the need for a door-operated plunger to shift from a non-tensioned or reduced-tensioned state and which automatically shifts to have both springs pull on the belt to rewind the same onto the reel.

The present invention provides a retractor in which one or a primary spring is always active to rewind the belt to remove slack in the belt and to eliminate any space between the belt and the wearer's chest. The single spring, of course, applies less tension forces to the wearer's chest and/or neck than does the two springs which are coupled together to rewind the belt. Herein, the two springs pull to rewind the belt whenever the belt is moved at least a predetermined length, for example, six inches. The driver of a vehicle often moves and reaches, e.g., to a glove box or a cigarette lighter, and causes belt extension sufficient to switch from the lighter one spring to the two spring belt force. When the driver returns to his original position, the retractor should either have remained in the single spring mode or be easily reset to its single spring mode to reduce the tensile force being applied to the driver's body. With the present invention, the belt may be extended up to 6 inches from its set position while remaining in its single spring mode.

A number of patents disclose the use of dual spring retractors with one of the springs being disabled to reduce the tension applied to the belt to rewind the belt when the belt is being worn and to have both springs enabled to exert a greater tension force to rewind the belt onto the reel when the wearer no longer is wearing the belt. For instance, U.S. Pat. No. 4,907,757 to Rumpf et al. has both a first wind-up spring and an auxiliary spring in a rotatable member at one end of the shaft. The auxiliary wind-up spring is tightly wound when the belt is rewound on the reel, unwound at belt protraction with the actuating means in position to allow the spindle to rotate relative to the rotatable member, and rewound about the spindle to the taut condition to limit belt retraction relative to the rotatable member. This latter condition provides a predetermined amount of slack in the belt at engagement of the comfort mechanism.

Other dual-spring retractor assemblies utilize a comfort system with worm gear arrangements as noted in U.S. Pat. Nos. 4,664,334 to Asagiri et al. and 4,546,934 to Nishimura et al., which latter arrangement transmits a rotation force of the worm wheel through a clutch to a large spring biasing the reel to retract the belt. The worm is operable after an emergency situation to rewind the large spring to the initial position.

The present application is directed to a less-complex, dual-spring retractor assembly for selectively and easily disengaging one of the rewind springs and to automatically initiate a reduced or tension-eased condition of the rewind force after belt protraction and subsequent retraction. No supplemental or secondary action by the wearer is required to enter the tension-ease mode. A pawl, which is engaged to initiate the tension-eased state at belt protraction beyond the comfort or tension-ease mode, is automatically disengaged at belt protraction to immediately activate the blocked-out spring for returning the assembly to the totally biased condition, that is, both springs acting to rewind the belt. A small subsequent belt retraction, such as one inch, again initiates the tension-ease mode.

SUMMARY OF THE INVENTION

The present invention provides a dual-spring retractor with a rewind-force-reducing or tension-easing assembly operable to block out one of the springs, which tension-easing assembly is automatically engageable after belt protraction without supplemental action by the user. One of the retraction springs continuously acts on the reel shaft to rewind the belt but the other of the dual springs is effectively and automatically blocked from acting on the shaft at activation of the tension-easing assembly.

The automatic blocking of one of the springs is accomplished by means of a simple clutch mechanism including a pawl and ratchet operating through a lost motion connection to the belt supporting reel. A structurally simple arrangement of four coaxially arranged interengaging parts provides the mechanism (1) for automatically disengaging the second rewind spring upon initial protraction of the seat belt; (2) for providing a reduced tension over further retraction of the seat belt for up to 6 inches; and (3) for reengagement of the second rewind spring upon further retraction or extension of the seat belt. The clutch mechanism includes a drive disc secured to the belt reel shaft. A block-out disc is axially biased into frictionally driven engagement with the drive disc and includes a peripheral cam which serves to render the pawl ineffective during belt retraction to provide maximum spring force to rewind the belt. The other parts of the clutch mechanism include the lock disc, which is a toothed wheel cooperating with a pawl to form a ratchet for rendering the second spring ineffective.

Positioned between the lock disc and the drive disc is a release disc which provides a lost motion driving connection between the lock disc and the drive disc.

The lost motion connection between the drive disc is provided to allow approximately one retraction position before the second spring is reconnected to the reel shaft. This one rotation of the shaft allows the user limited movement while retracting up to 6 inches of the belt under the low belt tension of the single spring. Further protracting the belt allows the reduced tension condition to be effective at a more extended position of the belt.

The release disc is drivingly connected to the lock disc through a lost motion mechanism that allows the cam teeth on the release disc to shift 30° with respect to the lock disc to displace the ratchet pawl from engagement with the lock disc.

The tension-easing assembly is easily assembled and readily operable to reduce the retractive force of the belt on the wearer while simultaneously maintaining the seat belt against the user. Further, this tension-easing assembly is readily adaptable to retractor structures equipped with an emergency activating device, such as an inertia mass operator independently operable to prohibit belt protraction at sudden deceleration.

Accordingly, it is an object of the present invention to provide an improved seat belt retractor employing two reel rewind springs one of which is selectively rendered effective to lessen tension on a seat belt while permitting a limited range of belt protraction and retraction with the lessened tension condition remaining in effect throughout this range.

Another object of the present invention is to provide an improved seat belt retractor having simplified means for automatically blocking the effectiveness of one of two belt retracting springs to provide tension ease condition by protracting or allowing retraction of the seat belt.

It is a further object of the present invention to provide an improved seat belt retractor having simplified means for selectively blocking the effectiveness of one of two seat belt rewind springs including interengaging discs rotating coaxially with a lost motion connection therebetween to provide a range of belt movement while in a reduced belt tension mode.

These and other objects and advantages of the invention will become apparent from the following detailed description taken in connection with the accompanying drawings.

BRIEF DESCRIPTION OF THE DRAWING

In the Figures of the drawing, like reference numerals identify like components, and in the drawing.

DETAILED DESCRIPTION OF THE PREFERRED EMBODIMENT

Figure 2:
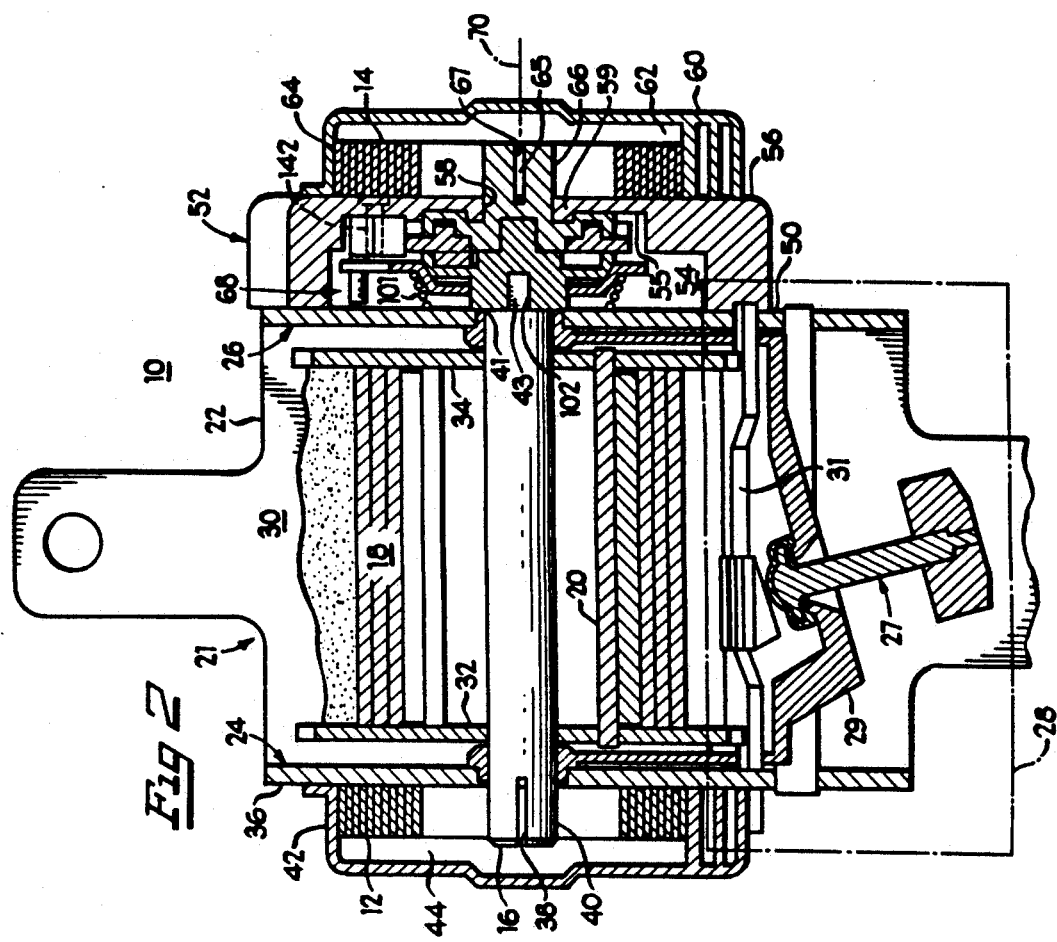
FIG. 2 is a front elevational view in cross-section of the retractor and tension-ease assembly taken along line 2—2 in FIG. 1.
Figure 1:
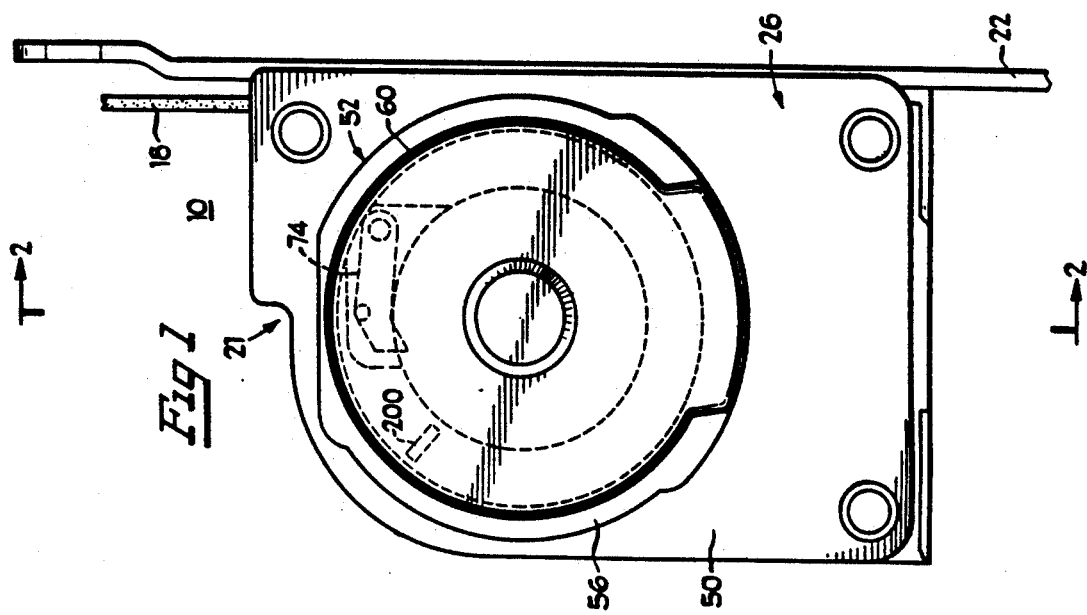
FIG. 1 is a side elevational view of a seat-belt retractor and tension-ease assembly embodying the present invention.

The present invention provides a seat-belt retractor system 10, as shown in FIGS. 1 and 2, which has a first spring 12 (FIG. 2) and a second spring 14 operably coupled to reel shaft 16 to bias the seat belt 18 to a rewound position on reel 20. The retractor assembly 10 includes a U-shaped retractor frame plate 21 with a central web 22 and with first sidewall 24 and second sidewall 26 extending normal to web 22 and generally parallel to each other. Sidewalls 24, 26 and mounting web 22 cooperate to provide the retractor housing for the several elements of seat-belt assembly 10, as well as mounting plates for subassemblies and elements external to the housing.

In the disclosed embodiment, the retractor assembly 10 has emergency locking means 28 including an inertia pendulum weight actuator 27 mounted on a support bracket 29 to actuate a lock bar 31 pivotally mounted in the retractor frame walls 24 and 26 to engage toothed ratchet wheels 32 and 34 on the rotatable reel. The reel 20 is mounted in the space 30 between sidewalls 24 and 26 and the reel shaft 16 extends through sidewalls 24 and 26, with ratchet wheels 32 and 34 mounted on and rotatable with shaft 16 and forming the sidewalls of the reels. The ratchet wheels 32, 34 are in proximity to sidewalls 24 and 26, respectively. First or primary rewinding spring 12 is positioned on outside wall or face 36 of sidewall 24 and is illustrated as a spiral-wound spring with a first end anchored to notch 38 in first shaft end 40. The opposite or outside end of spiral spring 12 is fixed to the cover 42, which is secured to outer face 36 of retractor frame sidewall 24 to cover and protect primary spring 12 in enclosure or cavity 44 in the cover. Primary spring 12 continuously biases shaft 16 and consequently reel 20 with belt 18, to the rewound or retracted position.

A cover 52, with a hollow interior chamber or enclosure 54 for tension-ease apparatus 68, is secured on outer surface 50 of second sidewall 26. A spring cup 60, with a cavity 62 for the second spring 14, is secured on outer surface or face 56 of cover 52, and cover 52 has a generally centrally located aperture 58 communicating between enclosure 54 and cavity 62. Second spring 14, which is shown as similar to first spring 12, is a spiral-wound coil spring affixed at its first and outer end 64 to spring cup 60 in the peripheral wall of cup 60 in a manner well known in the art. Spring 14 has its inner end 65 secured in slot 67 of a post or stub shaft 66 extending from tension-ease apparatus 68 in enclosure 54 through aperture 58 into cavity 62.

Figure 3A:
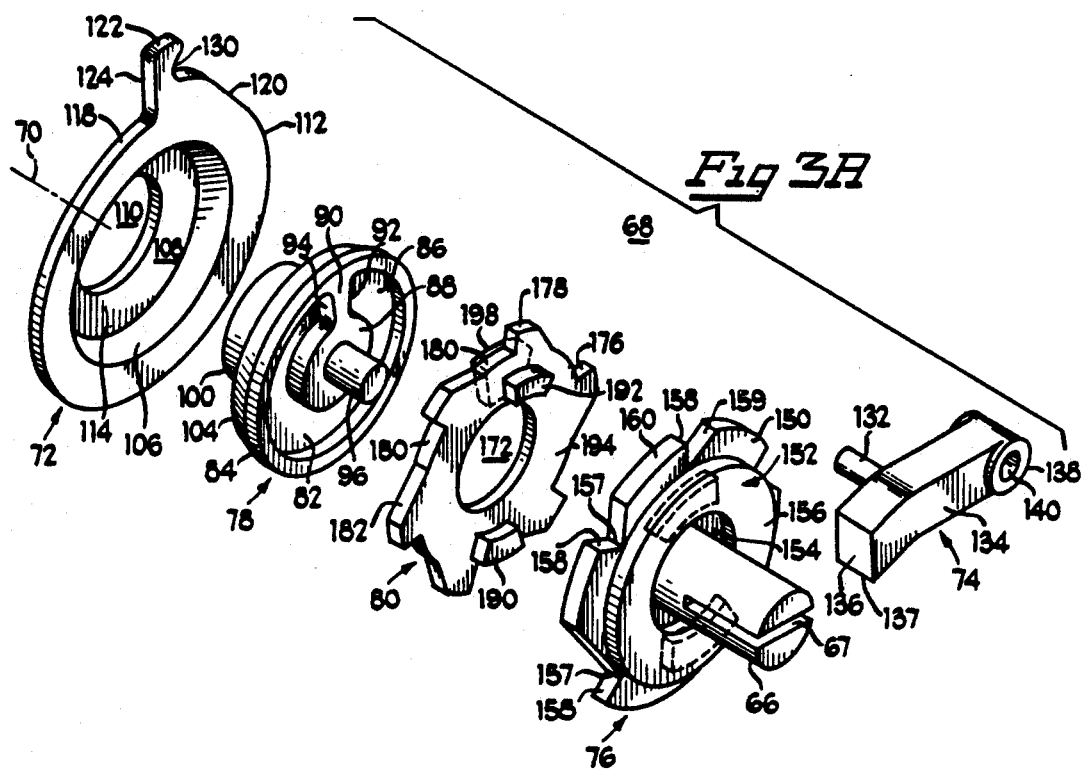
FIG. 3A is a first exploded perspective view of the tension-ease assembly.
Figure 3B:
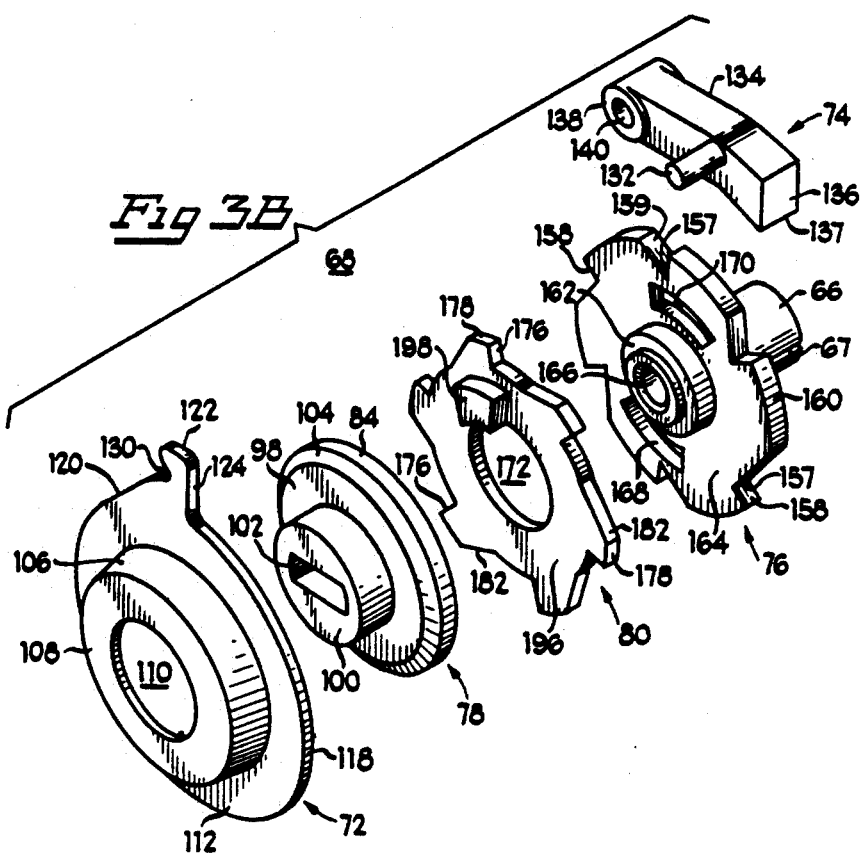
FIG. 3B is a second exploded perspective view of the tension-ease assembly.

Assembly 68 comprises a plurality of rotating discs coaxially aligned in face-to-face engagement for rotation along a longitudinal axis 70 of shaft 16. These coaxially aligned discs are best shown in FIGS. 3A and 3B and include a block-out disc 72, a drive disc 78, a release disc 80, and a lock disc 76. The purpose of these discs, along with a pawl 74, is to selectively transmit the biasing or rewind force of the spring 14 to shaft 16 on which the seat belt 18 is wound. As explained above, the spring 12 on one end of shaft 16 is continuously effective in applying its rewinding force to shaft 16, while the assembly 68 is designed to selectively render the spring 14 ineffective to reduce the tension on the seat belt 18 under normal use conditions, thus providing what is referred to as a tension-ease mode.

As will be explained in detail below, the drive disc 78 is fixedly secured to the shaft 16 and the lock disc 76 is attached to the inner end 65 of spring 14 by means of the integrally formed stub shaft 66. The release disc 80 is supported between drive disc 78 and lock disc 76 and is rotatable coaxially therewith. Suitable inter-engaging projections and recesses of the discs 76, 78 and 80 provide a lost motion connection between spring 14 and shaft 16 which permits almost one rotation of shaft 16 while stub shaft 66 and lock disc 76 remain fixed or locked. It is during this period when lock disc 76 is restrained from movement that the spring 14 is rendered ineffective, thereby reducing tension on the belt 18. The novel configuration of the discs 72, 76, 78 and 80 and the pawl 74 to be described below, provide the lost motion connection between shaft 16 and stub shaft 66 and the locking of the shaft 66 against rotation under certain conditions.

The drive disc 78 is secured to right end 41 of shaft 16, as shown in FIG. 2, by means of a flat tongue 43 on the end of shaft 16 which is received within a complementary slot 102 formed in boss 100 extending from rear face 98 of the drive disc 78. The engagement of tongue 43 in slot 102 locks the shaft 16 and drive disc against relative rotation.

The block-out disc 72, which is intended to withdraw the pawl 74 under certain conditions, is supported for rotational movement coaxial with shaft 16 and drive disc 78 by means of boss 100 on drive disc 78, which is received in a central bore 110 in bottom wall 108 of the block-out disc 72.

The block-out disc 72 is somewhat dish-shaped in configuration having a sloped sidewall 106 extending from the bottom wall 108 to peripheral flange 112 forming a shallow cavity 114 within which a portion of said drive disc 78 is received, as shown in FIG. 2. The sidewall 106 serves as one element of a frictional drive between drive disc 78 and block-out disc 72, the other element being a conical surface 104 on drive disc 78. The conical surface 104 is between cylindrical outer wall 84 and rear face 98 of the drive disc 78. The block-out disc 72 is mounted with some clearance on boss 100 so that it may rotate and move axially. A compression spring 101 mounted between the sidewall 26 and the rear face of block-out disc 72 biases the sloping surface 106 into engagement with the conical surface 104 so that there is a frictional driving engagement between the drive disc 78 and the block-out disc 72.

Figure 4A:
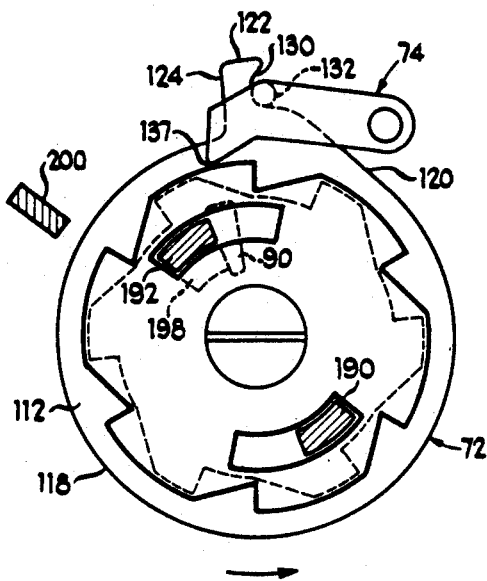
FIG. 4A is a schematic elevational view of the primary functional parts of the tension-ease assembly at a reference position.
Figure 4B:
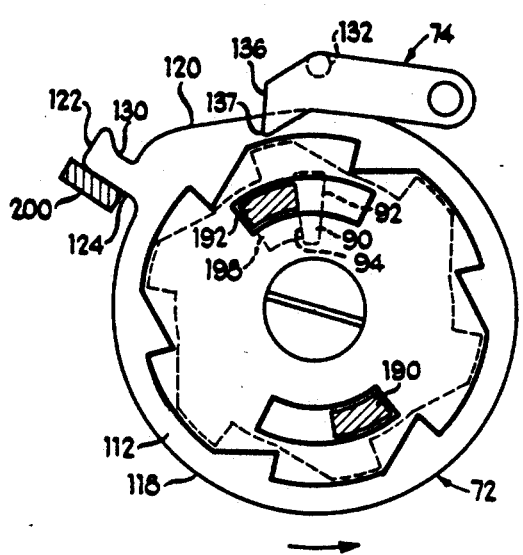
FIG. 4B is a schematic elevational view similar to FIG. 4A but showing the parts of the tension-ease assembly after belt protraction with the pawl contacting the lock disc.

The block-out disc 72 is restricted from rotating through more than an angle of about 45½ which is between the positions shown in FIG. 4A and FIG. 4B. In the position shown in FIG. 4A, block-out disc 72 restrains pawl 74 and in the position shown in FIG. 4B, it has released the pawl 74. The block-out disc 72 includes a flange 112 which terminates at its outer edge in a generally circular edge 118, which is interrupted in one area by a ramp-like cam or cam surface 120 extending generally tangential to edge 118, as is shown in FIGS. 4A-4D. The cam surface 120 terminates outwardly adjacent to a radially extending stop or shoulder 122 which serves to limit the rotary movement of block-out disc 72 through its engagement with a stop projection 200 formed outwardly from end wall 26 and positioned as shown in FIGS. 4A, 4B, 4C and 4D. The stop 122 is formed with an edge 124 which extends radially with respect to the axis 70 about which the block-out disc 72 rotates. The edge of stop 122 opposite the edge 124 is formed with a hook-shaped configuration 130 for engagement with the pawl 74.

As indicated above, the lock disc 76 and the cooperating pawl 74 provide the means for selectively rendering the spring 14 ineffective to achieve the reduced tension condition in the seat belt 18. The pawl 74 is pivotally mounted on the inner surface of cover 52 in cavity 54 by means of a mounting stud 142 which is received in an opening 140 formed in one end 138 of the pawl 74. The pawl 74 terminates at the end remote from its pivotal mounting in an end 136 having an edge 137 for engagement with teeth on the lock disc 76. It should be noted that pawl 74 is sufficiently wide to cooperate with and engage both the lock disc 76 and the release disc 80.

Figure 4C:
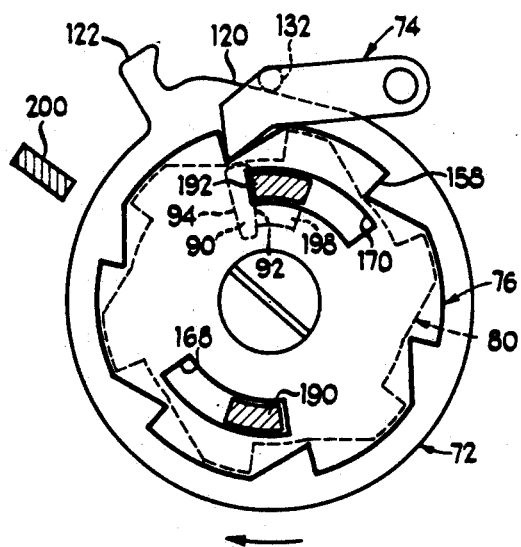
FIG. 4C is a schematic elevational view similar to FIG. 4A but showing the parts of the tension-ease assembly with the pawl engaged and blocking the one spring at belt retraction.
Figure 4D:
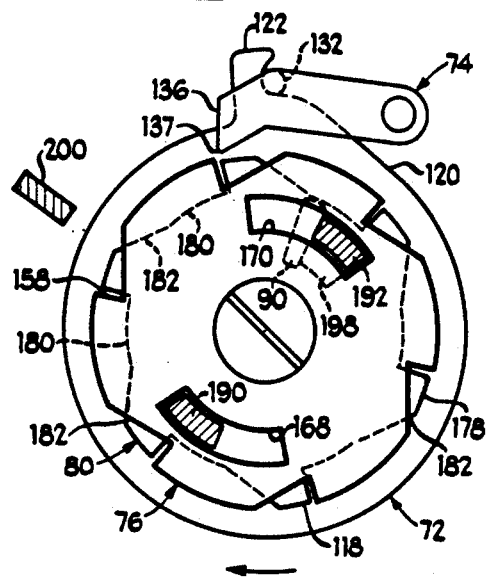
FIG. 4D is a schematic elevational view similar to FIG. 4A but showing the parts of the tension-ease assembly with the blocking disc again maintaining the pawl at the disengaged position.

Intermediate its ends, the pawl 74 is provided with a lug 132 which extends laterally into the plane of the block-out disc 72 for engagement by the cam surface 120 and the stop 122. Thus, when the block-out disc 72 is rotated to the limit of its clockwise movement, as shown in FIGS. 4A and 4D, the pawl 74 and its lug 132 arrest further clockwise movement through the engagement between this surface 130 of stop 122 against lug 132. At the same time, in moving into the position shown in FIGS. 4A and 4D, the pawl 74 has been elevated to its disengaged position through the action of the cam surface 120 against the lug 132.

As an alternative to the stop projection 200, the block-out disc 72 may be arrested in its counterclockwise rotation by the pawl 74 and lug 132. If the stop projection 200 is eliminated and the pawl 74 serves as a stop for rotation of the block-out disc 72 in either direction of rotation, the stop 122 on the block-out disc 72 would be made symmetrical about a radial axis with edge 124 modified to correspond with the hook-shaped configuration 130 and with a cam surface 120. Thus, the stop 122 would engage lug 132 of pawl 74 with a hook-shaped configuration when the block-out disc 72 is rotated either clockwise or counterclockwise with stop projection 200 removed. In such an embodiment, the block-out disc 72 would be rotatable through almost a full 360 degrees.

As described above, the pawl 74 cooperates with the lock disc 76 to render the spring 14 ineffective. The lock disc 76 is formed on its circumference 160 with a plurality of wide teeth 158 which define V-shaped notches 157 adopted to fully receive the edge 137 of the pawl 74. This engagement serves to lock the lock disc from movement in clockwise direction as shown in FIG. 4C. To further support the rotational movement of lock disc 76, the front face 150 of lock disc 76 is formed with an annular ring 152 which defines with the stub shaft 66 an annular recess 154. The recess 154 receives an annular shoulder 59 extending from the inside surface 55 of cover 52. This interengagement between lock disc 76 and the complementary configured inside surface 55 of cover 52 provides bearing support to maintain stub shaft 66 aligned on axis 70.

For the purpose of supporting the release disc 80 for limited rotational movement with respect to lock disc 76, there is provided an annular hub 162 extending from the rear face 164 of the lock disc 76. The release disc 80 is formed with a central opening 172 which journals the release disc 80 for rotation on hub 162. The release disc 80 is sandwiched between the drive disc 78 and the lock disc 76 with interengaging projections and recesses to be discussed below, to provide lost motion connections or limited angular relative movement between the adjacent discs. To assure the axial alignment of the assembly of discs 78, 80 and 76, the drive disc 78 is formed with a stub shaft 96 which extends into a blind hole bore 166 in the hub 162 of the lock disc 76 to journal the lock disc 76 on the shaft 96. The release disc 80 has a plurality of teeth 176 spaced at the same interval as the teeth on the lock disc 76, but angled in an opposite direction. Between each of the pairs of teeth 176 there is a base 180 and a sloped ramp 182 which angles between the circumference 178 and base 180.

A comparison of FIG. 4C and FIG. 4D illustrates the relative positions of the release disc 80 and the lock disc 76 when the discs are in the pawl-engaged position and the pawl-release position, respectively. The release disc 80, in moving from the position in FIG. 4C to that shown in FIG. 4D, causes the sloped ramps 182 to cam the edge 137 of the pawl 74 out of engagement with the teeth 158 on the lock disc 76. The lost motion connection between the release disc 80 and the lock disc 76, which limits relative movement to that shown in FIG. 4C and FIG. 4D, consists of two arcuate recesses 168 and 170 formed in lock disc 76, which recesses receive first and second tangs 190 and 192 protruding from front face 194 of the release disc 80. As may be best understood from the views in FIGS. 4C and 4D, the tangs 190 and 192 are limited in the extent of their circumferential movement so that there may be about 30° of relative movement between the release disc 80 and the lock disc 76.

The lost motion connection between the release disc 80 and the drive disc 78 includes a third tang 198 extending from the rear face 196 of release disc 80 into a cooperating annular groove or recess 86 formed on front surface 82 of drive disc 78 by a peripheral wall 84 and a hub 88. Extending between the hub 88 and the wall 84 is a radial arm or wall 90 having a first sidewall 92 and a second sidewall 94, which sidewalls define the ends of the annular recess 86 and the limits of the movement of the third tang 198 therein. Thus, the lost motion connection between the drive disc 78 and the release disc 80, including the third tang 198 and the recess 86, permits the drive disc 78 to rotate almost one full turn while the tang 198 moves between engagement with the first and second sidewalls 92, 94.

The purpose of the lost motion connection between the drive disc 78 and the release disc 80 is to provide a range of movement of belt 18 under the reduced-tension condition. The approximate one turn is equal to about 6 inches of belt movement. Thus, when the reduced tension condition is achieved in apparatus 68 as the seat belt 18 is first protracted from the reel 20 and the pawl 74 engages the lock disc 76 (as shown in FIG. 4C), the single spring 12 will exert its retracting tension on the belt 18, with the second spring 14 being rendered ineffective. This condition will prevail until sufficient retraction has occurred for the drive disc 78 to drive the release disc 80 through a 30° angle to release the pawl 74. This action cannot take place until the slack has been removed from the lost motion connection between drive disc 78 and release disc 80, which requires the drive disc 78 to rotate the wall 90 from one side of the tang 198 to the other as shown in moving from the position shown in FIG. 4B to that shown in FIG. 4C. When this amount of belt retraction and drive disc 78 rotation has occurred, the release disc 80 will be driven from the position shown in dashed lines in FIG. 4C to the position shown in FIG. 4D. This rotation causes release of pawl 74 from engagement with the lock disc 76 and again renders the second spring 14 effective in retracting the belt 18. Drive disc 78 and block-out disc 72 are frictionally engaged at shoulder 104 for coupling drive and they may slip relative to each other along this contact edge. As the release disc 80 disengages the pawl 74 as shown in FIG. 4D, the drive disc 78 rotates block-out disc 72 with its block-out ramp 120 until the stop 122 engages the lug 132, limiting further clockwise movement. In this position the block-out disc retains the pawl 74 disengaged from the lock disc 76.

If, with the tension-ease apparatus 68 in the reduced tension position of FIG. 4C, there is a further protraction of the belt 18 as would occur with the user reaching for something in the glove compartment, the lost motion connection between the drive disc 78 and the release disc 80 would allow almost a full rotation of the drive disc 78 before the parts would cause disengagement of the pawl 74 as the parts moved into the relative positions shown in FIG. 4B. Thus, about 6 inches of the belt could be protracted before the increased tension would be applied to the belt. This arrangement provides the user with the convenience of having the freedom of limited movement in his seat while the reduced belt tension remains unchanged as the belt protracts and retracts. If the user exceeds the range of movement permitted by the lost motion connection in protracting the belt, the retractor system simply resets itself to provide the tension-ease condition at a more extended position on the belt.

The retractor system 10 is operable to provide the storage facility for safety belt 18 at a belt-retracted mode and to allow protraction of belt 18 for securing a passenger in his seat. Further, retractor 10 has the tension-ease system 68 directly coupled to spring 14, which selectively disengages spring 14, but allows spring 12 to continuously bias shaft 16 to retract belt 18 on reel 20. Thus, belt 18 is continuously biased to rewind and, when secured across a passenger, it is maintained against the passenger with a reduced retractive force. Operation of tension-ease system 68 does not interfere with emergency system 28, which is activated at sudden vehicle deceleration to prohibit protraction of belt 18.

Tension-ease system 68 does not interfere with or prohibit belt 18 protraction from reel 20. As belt 18 is protracted, drive disc 78 rotates with shaft 16 through its coupling at shaft tongue 43, while first spring 12, which is directly coupled to shaft 16, continuously acts in an unimpeded manner to rewind belt 18. As shaft 16 rotates from the reference position shown in FIG. 4A, drive disc 78 rotates block-out disc 72 counterclockwise as shown in FIG. 4B until positive stop 122 at first shoulder 124 engages lug 200 extending from outer surface 50 of second-sidewall 26.

As the belt protraction occurs with the discs 72, 76, 78 and 80 occupying the positions shown in FIG. 4B, the rotation of the drive disc 78 counterclockwise causes the third tang 198 on the release disc 80 to be urged by the action of spring 14 against the second edge 94 of the radial arm 90 of the drive disc 78 as shown in dashed lines in FIG. 4B. Similarly, the tangs 190, 192 on the release disc are disposed ends of the recesses 168 and 170 as a consequence of the spring 14 biasing the lock disc 76 in a clockwise direction in FIG. 4B while the protracting belt is turning the drive disc 78 and its radial arm 90 counterclockwise. With the counterclockwise rotation of the lock disc 76, as shown in FIG. 4B, the pawl 74 rides across the teeth 158, having no tendency to restrain rotation of lock disc 76.

It should be understood that while the schematic showings of FIGS. 4A–4D picture the parts in their relative positions to perform the various functions, the discs 76, 78 and 80 would be rotating as the belt 18 protracted and retracted and only the block-out disc 72 would move within the limits shown.

When protraction of the belt ceases, a slight retraction causes the pawl edge 137 of pawl 74 to engage a tooth 158 or root 157 on the lock disc 76 as the lock disc moves clockwise as shown in FIG. 4C. As may be seen from FIG. 4C, the release disc 80 is still positioned as is shown in FIG. 4B so that the teeth 178 of the release disc 80 are generally aligned with the teeth 158, so as to not obstruct the pawl 74 from entering into locking engagement with the lock disc 76. Once the pawl 74 has moved into such locking engagement with lock disc 76, the force of the second spring 14 will no longer be transmitted through the tension-ease system 68 to the shaft 16, thereby lessening the retraction force on the belt 18.

This locking engagement of the pawl 74 will be maintained until either further protraction of the belt 18 takes place to move the parts to the FIG. 4B position or until sufficient retraction at the reduced tension has taken place to rotate the drive disc 78 and release disc 80 sufficiently to move to the release position as shown in FIG. 4D. As the drive disc 78 rotates clockwise during belt retraction from the position shown in FIG. 4C, the drive disc 78 and release disc 80 move together, causing the release disc 80 to rotate approximately 30° with respect to the lock disc 76 to release position shown in FIG. 4D, where the sloping surfaces 182 cam the pawl 74 out of engagement with the lock disc 76. At the same time the release disc 80 is driven to its release position as shown in FIG. 4D, the block-out disc 72 is also rotated from its position against stop 200 to its other limit of rotation, with stop post 122 engaged with the pawl stud 132. In arriving at that position, the pawl stud 132 moves along the cam surface 120 to thus elevate the pawl 74 out of contact with the lock disc 76.

Protraction of belt 18 in the tension-ease mode rotates drive disc 78 at least through about one turn or revolution to contact radial arm 90 on the opposite side of third tang 198, and to thus rotate release disc 80 with respect to lock disc 76 to elevate pawl 74 from the engaged position to the disengaged position with pawl lower edge 137 sliding upwardly along tooth ramp 159 to the outer circumference 160 of the disc. Release of pawl 74 allows second spring 14 to immediately unwind to catch up to the position of first spring 12. Further, this unwinding of second spring 14 repositions lock disc 76, release disc 80, drive disc 78 and block-out disc 72 to a freely rotating position, as noted in FIG. 4D. Thereafter, belt 18 is freely protractable and retractable. Tension-ease assembly 68 may again be repositioned in the tension-ease mode by pulling the belt a slight distance to again rotate the drive disc 78, release disc 80 and lock disc 76 to allow pawl end 136 to nest in a lock-disc tooth 158.

While only a specific embodiment of the invention has been described and shown, it is apparent that various alterations and modifications can be made therein. It is, therefore, the intention in the appended claims to cover all such modifications and alterations as may fall within the scope and spirit of the invention.

What is claimed is:

1. A safety belt retractor system with a reel on a shaft and having a belt wound on said reel, which belt is protractible and retractable from said reel, said shaft having a longitudinal axis, first end and a second end, first means for biasing said reel and belt to a rewound and retracted position, which first biasing means is mounted and operable at said first shaft end, second means for biasing said reel and belt to a rewound and retracted position, said second biasing means mounted and operable at said second shaft end, means for deactivating said second biasing means to reduce the rewind bias on said belt at a tension-ease position, said deactivating means comprising:

a housing having an enclosure, which housing is positioned over said second shaft end;

driving means positioned in said enclosure and mounted on said second shaft end and rotatable with said shaft;

a pawl pivotally mounted on said housing in said enclosure;

A cover on said housing defining a cavity for said second biasing means;

ratcheting means having at least one ratchet tooth, which ratcheting means is rotatably coupled to said driving means; said ratcheting means when engaged by said pawl activating said second biasing means to reduce the rewind bias on said belt at the tension-ease position;

said second biasing means positioned in said cavity and operably connected between said cover and said ratcheting means;

said ratcheting means tooth engageable by said pawl in the tension-ease position to secure said ratcheting means and disengage said second biasing means from biasing said reel and belt;

a block-out disc frictionally engaged with said driving means and rotatable between a pawl engaged position and disengaged position; said block-out disc when in said pawl disengaged position holds said pawl from engagement with said ratcheting means tooth during belt rewinding onto the reel to allow both first and second means for biasing to provide force to wind the belt onto the reel; and, a release disc with at least one release-disc tooth, said release disc providing a lost motion connection between said driving means and said ratchet means to allow a limited belt protraction and retraction while the belt is in the tension ease mode;

said release disc having a tooth to shift the pawl from said one ratchet tooth on the ratcheting means to initiate a belt rewind.

2. A retractor system as claimed in claim 1 further comprising third means for biasing said block-out disc against said driving means and for frictional driving of said block-out disc by said driving means.

3. A retractor system as claimed in claim 2 wherein said driving means includes a driving disc having a first face engaged by said block-out disc and a second face formed with a semi-annular recess surrounding a hub, a radial arm extending across and defining the ends of said semi-annular recess, said radial arm having a first edge and a second edge;

said release disc having a central bore, a driving means face and a ratcheting means face, a first tang on said driving means face, which first tang is rotatable in said driving disc recess between said radial arm first and second edges to provide predetermined belt travel in said tension-ease mode, and to rotate said release disc to disengage said pawl from said engaged position.

4. A retractor system as claimed in claim 3 wherein said ratcheting means is a lock disc, said release disc further comprising at least one second tang for engagement with said lock disc;

said lock disc having a driving side with at least one arcuate recess for each said second tang, said arcuate recess having a first endwall and a second endwall;

said second tang engageable with said arcuate recess first and second endwalls to limit relative rotation between the lock disc and the release disc.

5. A retractor system as claimed in claim 4 wherein each said lock disc arcuate recess is displaced outwardly radially from a common axis of rotation of said reel shaft and said discs and has a thirty-degree arc length.

6. A retractor system as claimed in claim 5 wherein said lock disc and said release disc are each provided with a plurality of ratchet teeth and release disc teeth respectively around their periphery, said ratchet teeth and release disc teeth being each provided with an outer circumferential surface, and a ramp extending from said outer circumferential surface into each disc and terminating at a tooth root, said lock disc having an annulus extending through said release disc central bore, which release disc is rotatable on said annulus;

said release disc and said lock disc being in a juxtaposed alignment with the respective teeth having opposed ramp positions, said release disc and lock disc being rotatable to align said ratchet teeth and release disc teeth to receive said pawl for engagement with said ratchet teeth to position said retractor system at said tension-ease mode, said release disc being rotatable to move said pawl from engagement with said ratchet teeth to permit rewinding of said belt by said first and second biasing means.

7. A retractor system as claimed in claim 4 wherein said lock disc has said one recess and has a second arcuate recess, which first and second recesses are diametrically located on said driving side of said lock disc.

8. A retractor system as claimed in claim 4 wherein said lock disc has a biasing-means side and further comprises a post with an outer face, which post generally extends normal to said biasing-means side and coaxial with the axis of rotation of said lock disc, said post having a cross-slit at said outer face;

said second biasing means is a coil spring with a first end and a second end, said coil spring positioned around said post in said cover, one of said second spring ends secured to said cover and the other of said second spring ends mated with said cross-slit for rotation with said post and shaft.

* * * * *